May 12, 1925. Re. 16,067

C. F. FELTZ

MOTOR DRIVEN VEHICLE

Original Filed Jan. 5, 1914

Inventor:
CHARLES F. FELTZ,
By John H. Bruninga,
His Attorney.

Reissued May 12, 1925. Re. 16,067

UNITED STATES PATENT OFFICE.

CHARLES F. FELTZ, OF ST. LOUIS, MISSOURI, ASSIGNOR, BY DIRECT AND MESNE ASSIGNMENTS, TO STONAY L. LANGDALE, TRUSTEE, OF ST. LOUIS, MISSOURI.

MOTOR-DRIVEN VEHICLE.

Original No. 1,193,132, dated August 1, 1916, Serial No. 810,373, filed January 5, 1914. Application for reissue filed September 11, 1920. Serial No. 409,708.

*To all whom it may concern:*

Be it known that I, CHARLES F. FELTZ, a citizen of the United States of America, and residing in the city of St. Louis, State of Missouri, have invented certain new and useful Improvements in Motor-Driven Vehicles, of which the following is a specification.

This invention relates to motor vehicles, more particularly of that type employing internal combustion engines.

In the modern motor vehicle employing an internal combustion engine of the multi-cylinder type, there is provided a chassis which is supported by springs on the road wheels. The forward wheels are used for the purpose of steering while the rear wheels form the traction wheels. The engine itself is supported on the chassis and it operates at a speed controlled by the throttle in the intake leading from the carburetor.

The engine is arranged to drive the traction wheels through a line of driving connections comprising, a shiftable clutch leading from the engine, differential gearing leading to the traction wheels and intermediate transmission gearing completing the line of driving connections.

In a motor vehicle employing an internal combustion engine, a shiftable clutch is necessary in order to permit starting and control of the engine, stopping of the vehicle and control of the vehicle through the transmission gearing. The clutch is universally arranged to be shifted by a pedal so as to disconnect or uncouple the engine from the line of driving connections, while this clutch is normally retained in engagement by a spring or springs.

The transmission gearing placed intermediate the clutch and the differential gearing, comprises gear elements, which are arranged to provide for two or more speeds forward and for a reverse speed, in order that the starting of the vehicle and negotiations of grades may be facilitated and the direction of movement of the vehicle controlled. During the normal forward movement of the vehicle at high speed, the transmission gearing is universally constructed so as to provide for a direct drive from the clutch to the differential gearing, while on an indirect drive or lower speed, the gear ratio between the engine and the differential gearing is reduced. On direct drive, therefore, the connections between the clutch and the differential gearing is in the form of a direct coupling through the direct drive elements of the transmission gearing.

Where as in the modern vehicle, there are a pair of traction wheels, it is necessary to provide differential gearing leading from the transmission gearing and leading to the respective traction wheels, in order to compensate for the different relative speeds of the respective traction wheels as when going around curves. In order, however, that the tractive effort may be applied to both wheels at all times, especially when going around a curve, it is necessary that the differential gearing be so constructed as to positively drive both wheels. Accordingly in the present form of differential gearing as universally employed, the gearing comprises a series of intermeshing gear elements connected with the shaft leading from the transmission gearing, and leading to the axle sections connected with the traction wheels, whereby the tractive effort is applied positively to both wheels at all times, irrespective of whether the vehicle moves along a straight or curved path and irrespective of whether it moves forward or reversely.

In the operation of the motor vehicle, when the clutch is engaged and when the transmission is shifted, for instance, for a forward speed on direct drive, there is an uninterrupted line of driving connections from the engine to the traction wheels. Accordingly when the vehicle is traveling so that when a driving torque is applied by the engine through the line of connections to the traction wheels, as when going up a grade and in most cases when traveling on the level ground, the engine will drive the wheels and this driving torque is applied through the differential positively to both traction wheels. When, however, the vehicle is traveling down grade, or the momentum carries the vehicle onward even when traveling on the level, so that the free running speed of the engine will be less than that of the connected line of driving connections, then the traction wheels will drive the engine through that line of connections.

If under these last conditions the engine is uncoupled by shifting of the clutch, both the engine and the gearing in the line of driving connections are permitted to run free but independently with the result, especially when going down grade, that the clutch element still connected with and driven by the traction wheels may run at higher speed than the clutch element still connected with the engine. If, therefore, under these conditions, the engine is suddenly coupled to the traction wheels by engagement of the clutch upon release of the clutch pedal, all of the mechanism in the line of driving connections is subjected to a very heavy shock, as the engine then acts as a brake opposing any sudden increases of its speed due to the inertia of its moving parts. Not only will the mechanism in the line of driving connections be subjected to a heavy shock, which may cause breakage and in any event undue strain on those parts, but the fact that the engine acts as a brake, it may actually have the effect of applying such an excessive braking action to the traction wheels that they will become "locked" and, therefore, slide so as to cause undue wear and tear on the tires.

On the other hand, if the clutch is not shifted when going down a grade, the engine will not become disconnected but will be continuously driven, so that even if the ignition is opened, fuel will still be consumed while traveling down grade, thereby causing wastage of the fuel.

In the operation of a motor vehicle, an inexperienced or careless driver will frequently shift the clutch while going down a grade and again release the clutch pedal and engage the clutch immediately after the vehicle reaches the bottom of the hill, so that the driving effort of the traction wheels revolving at that time at a high speed is suddenly transmitted to the engine with possible disastrous results, and in any case, resulting in wear and tear of the mechanism in the line of driving connections and wear and tear on the tires.

One of the objects of this invention, therefore, is to provide a motor vehicle having an engine and traction wheels in which the driving connections from the engine to the wheels is so constructed and arranged that while the driving effort is applied by the engine positively to both traction wheels, the driving of the engine by the wheels is precluded.

Another object of this invention is to provide improved means in a motor driven vehicle whereby, if the speed of the driving wheels thereof is accelerated above the intended driving speed of the motor, the motor will be automatically released from driving contact with the driven wheels.

Another object is to provide improved means whereby the motor cannot be driven by the tractor wheels of the vehicle.

Other and further objects will appear in the specification, and be specifically pointed out in the appended claims, reference being had to the accompanying drawings exemplifying the invention, and in which, Figure 1 is a plan view of the running gear of a vehicle showing a motor or engine mounted therein;

Figure 1:
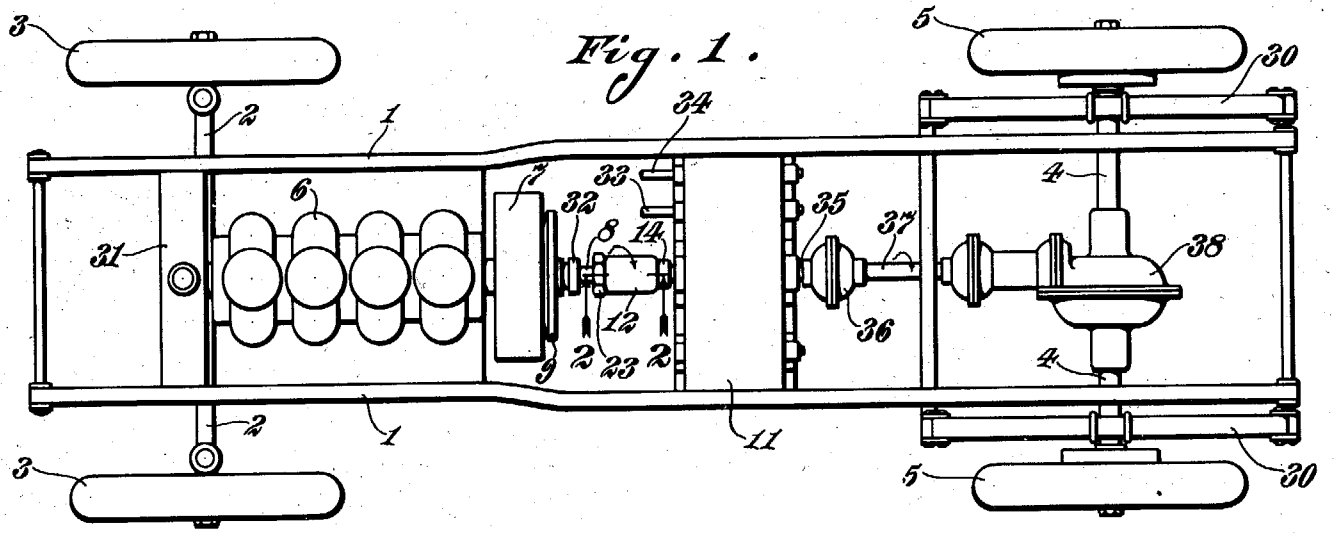

Referring to the accompanying drawing, the frame or chassis 1 of the vehicle is mounted on the front axle 2 through the medium of suitable springs (not shown), said axle being supported by the steering wheels 3. The rear end of the chassis or frame is supported on the rear axle tubes 4 through the medium of springs 30, the axle being supported on traction wheels 5. Supported on the chassis is an engine or motor 6 which is of the usual internal combustion type, being, in this case, diagrammatically shown as a multi-cylinder engine having its crank shaft provided with a fly-wheel 7, the usual form of radiator being shown at 31. The fly-wheel 7 forms one element of a clutch, the other element of which is shown at 9 and slidingly mounted on a shaft 8. The clutch is normally held in engagement by a suitable spring (not shown) and this is shifted by a suitable pedal connected with a collar 32 on the movable clutch element 9, whereby the clutch element 9 splined to the shaft 8 may be shifted to engage with and become disengaged from the clutch element 7.

Mounted on the chassis frame is a transmission gearing housing 11, which may be of any suitable construction so as to provide for one or more forward speeds and reverse speed. The transmission gearing is controlled by suitable elements 33 and 34 from a suitable control lever. A driven shaft 10 in horizontal alinement with the drive shaft 8 connected with the clutch element 9, leads into the transmission gearing, while leading out of the transmission gearing is a shaft 35 connected by a universal joint 36 with a propeller shaft 37. The transmisison gearing is constructed so as to provide for direct drive, that is, direct coupling of the shafts 10 and 35 at high or normal speed, and for indirect driving through reducing gearing on the other forward speed or speeds and on the reverse speed.

The propeller shaft 37 is provided at its rear end with the usual bevel pinion, meshing with a bevel gear in axial alinement with the axle sections connected with the traction wheels 5 and connected by any suitable form of gear elements with the axle sections, so as to provide differential gearing between the propeller shaft and the axle sections but arranged to positively drive both traction wheels. The bevel gears and the differential gearing are mounted in a differential housing 38 which connects the axle tubes 4, in which are arranged the axle sections, so as to form a firm and rigid structure. It will be understood that as usual the axle sections are connected at their outer ends with the traction wheels and at their inner ends with the elements of the differential gearing.

The parts so far described are well known in the prior art and as they may be of any suitable or usual construction, as is the practice in the art and as above described, further detail description will be unnecessary. It will, however, be seen that in such a construction, there is a positive line of driving connections between the motor and the traction wheels, except when the clutch is shifted to break that line of connections so that this usual line of connections will be open to the objections previously pointed out.

Now in accordance with this invention, means is provided which will effect driving of the traction wheels by the engine but preclude driving of the engine by the wheels. This is accomplished by placing in the line of driving connections a device which will make the connection when the driving is from the engine to the wheels, but break the connections when the driving is from the wheels to the engine, when the wheels tend to drive the engine and when the wheels operate at a speed greater than that of the connected engine. Accordingly an automatic element is placed in the line of driving connections, and in this particular embodiment, between the clutch and the transmission gearing so that when the drive is from the engine to the traction wheels, the driving connection is maintained, while when the drive is from the traction wheels to the engine, the connection is broken.

Figure 3:
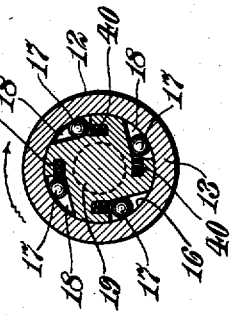
Figure 3 is an enlarged section on the line 3—3, Figure 2.
Figure 2:
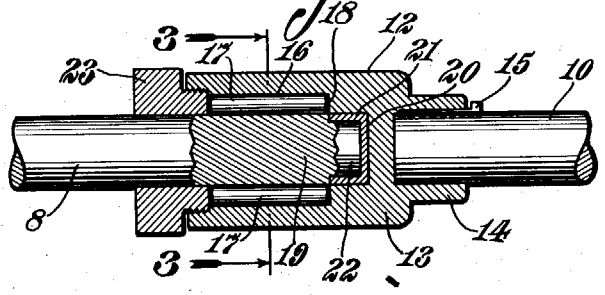
Figure 2 is an enlarged section on the line 2—2, Figure 1.

Referring now more particularly to Figures 2 and 3, connecting and mounted on the ends of the shafts 8 and 10 is the automatic element embodying a ratchet or clutch 12, said clutch comprising a casing 13 having a hub 14, said hub being securely mounted on the end of the shaft 10 by a key 15 so as to provide a keyed connection. Formed in said casing 13 at the end opposite to the hub 14 is a chamber 16. Said chamber is for the reception of a series of rollers 17 which are supported in the wedge shaped pockets 18 of the roller-carrying member 19 which is formed on the shaft 8, while light springs 40 arranged in sockets in the member 19 and engaging the rollers 17 tend to move these rollers into the narrow ends of the pockets. Formed in the end of the chamber 16 is a circular recess 20 in which is mounted an end thrust bearing 21. Said end thrust bearing is for the reception of the reduced end 22 of the shaft 8. In order to retain the rollers 17 and the roller-carrying member in the chamber 16, a nut 23 is screwed into the open end of the chamber 16.

There is thus formed a roller clutch between the shafts 8 and 10, which is so constructed that when shaft 8 is turned in the direction of the arrow (Figure 3), the rollers 17 will be forced by the inclined faces on the clutch element 19 against the inside face of the clutch element 13, so as to secure a firm clutching connection, whereby the shafts 8 and 10 are coupled together, so that shaft 8 will drive shaft 10. However, if power is applied to shaft 10 so as to turn in the same direction (Figure 3) then the rollers 17 will be moved into the deep parts of the chambers 18, so that connection between the shafts 8 and 10 will now be broken, and shaft 10 can then revolve in the direction of the arrow, Figure 3, without revolving the shaft 8.

In transmitting power from the motor or engine to the traction wheels, the shafts 8 and 10 travel in the direction of the arrow, Figures 1 and 3, and in such case the shaft 8 will be the driving shaft, while shaft 10 will be the driven shaft and will be retarded by the traction wheels. Accordingly the rollers 17 are forced into engagement with the inner face of the clutch element 13 and the power is positively transmitted from shaft 8 to shaft 10 and hence through the transmission and differential to the traction wheels. Accordingly the engine will at this time positively drive both of the traction wheels, whether the transmission gearing is shifted to forward or reverse, in view of the fact that the rotation of the shaft 10 is the same for forward and reverse, and this is true also when the transmission gearing is shifted for a direct drive causing a direct coupling of the shafts 10 and 35. However, when a condition is established where the traction wheels tend to drive the engine, then since the shaft 10 is now the driving shaft, the clutch connection to shaft 8 is uncoupled and accordingly there is no transmission beyond the shaft 10. This is true no matter what may be the position of the transmission controlling lever, or whether it is shifted for forward speed or for reverse and even when coupled for direct drive forward.

It will, therefore, be seen that the invention accomplishes its objects. The driving connections between the engine and the traction wheels are such that both of the traction wheels will be positively driven under normal conditions and while the engine is driving the traction wheels. If, however, the traction wheels tend to drive the engine as when going down a grade, the driving connections are immediately and automatically broken and the engine may, therefore, be stopped so as to not consume any fuel while running down a grade. If the vehicle is traveling at a very high rate of speed, even with the main clutch uncoupled, after passing from the incline, the engine may be coupled to the transmission mechanism to provide for any desired speed, and there will be no transmission of power from the motor to the traction wheels, or vice versa, unless the speed of the vehicle is in synchronism with the speed of the transmission due to the traction wheels. If the traction wheels are traveling at an excessive rate of speed, the wheels will turn independently of the engine until the speed of the vehicle agrees with the speed of the engine. The engine will then begin to drive the vehicle without jerking or without in any way impairing the driving mechanism. Accordingly shocks to the driving mechanism and to the engine are not only avoided but wear and tear on the tires is eliminated from that source. In accordance with this invention, the torque is always transmitted from the propeller shaft positively to both wheels whether going around a curve or straight ahead; accordingly both wheels are at all times driving wheels.

It is obvious that various changes may be made in the details of construction without departing from the spirit of this invention; it is, therefore, to be understood that this invention is not to be limited to the specific details shown and described.

Having thus described the invention, what is claimed is:

1. In a motor vehicle, driving mechanism comprising a motor, transmission gearing, a drive shaft operable by said motor, a driven shaft for operating said transmission gearing, said drive shaft being alined with said driven shaft, and a clutch device including a clutch member secured to one of said shafts and overlapping the other shaft, said clutch device being adapted to lock said drive shaft to said driven shaft when said motor is transmitting power to said transmission gearing, said driven shaft being free to turn at a higher rate of speed than the drive shaft when the clutch device is in its operative condition and said clutch device being free to uncouple said shafts automatically when said driven shaft is turned at a higher rate of speed than the speed of said drive shaft.

2. In a motor vehicle, driving mechanism comprising traction wheels, a transmission device for transmitting power to said traction wheels, a motor, and means for transmitting power from said motor to said transmission device, said means including a drive shaft operable by said motor, a driven shaft for transmitting power from said drive shaft to said transmission device, and a clutch device adapted to unite said shafts when they are turning at the same speed, said driven shaft being free to turn at a higher rate of speed than the drive shaft when the clutch device is in its operative condition and said clutch device being free to uncouple said shafts automatically when said driven shaft turns at a higher rate of speed than said drive shaft, thereby permitting said traction wheels, transmission device and driven shaft to turn independently of said motor and drive shaft.

3. In a motor vehicle, driving mechanism comprising a motor, a transmission device, alined shafts extending from and located between said motor and transmission device, and a clutch device adapted to unite said shafts when they are turning at the same speed, the driven elements of said clutch device being free to turn at a greater speed than the drive elements when the clutch device is in its operative condition, thereby allowing the driven shaft to turn at a greater speed than the other shaft.

4. In a motor vehicle, driving mechanism comprising, a motor, a transmission device adapted to be operated by said motor, a drive shaft leading from said motor, a driven shaft extending from said transmission device and alined with said drive shaft, and a clutch device adapted to rigidly connect said shafts when they are turning at the same speed, the driven elements of said clutch device being free to turn at a greater speed than the drive elements when the clutch device is in its operative condition, thereby allowing the driven shaft to be released automatically when one of said shafts turns at a higher rate of speed than the other shaft.

5. In a motor vehicle having an engine and traction wheels, driving connections from said engine to said wheels, comprising, a shiftable clutch leading from said engine, differential gearing leading to said wheels, transmission gearing intermediate said clutch and said differential gearing, and a clutch device between said clutch and said transmission gearing adapted to effect driving of said wheels by said engine but preclude driving of said engine by said wheels.

6. In a motor vehicle having an engine and traction wheels, driving connections from said engine to said wheels, comprising, a shiftable clutch leading from said engine, differential gearing leading to said wheels, transmission gearing shiftable for forward and reverse driving and arranged intermediate said clutch and said differential gearing, and a clutch device between said clutch and said transmission gearing adapted to effect driving of said wheels by said engine but preclude driving of said engine by said wheels.

7. In a motor vehicle having an engine and traction wheels, driving connections from said engine to said wheels, comprising, a shiftable clutch leading from said engine, differential gearing leading to said wheels, transmission gearing shiftable for direct and indirect driving and arranged intermediate said clutch and said differential gearing, and a clutch device between said clutch and said transmission gearing adapted to effect driving of said wheels by said engine but preclude driving of said engine by said wheels when said transmission gearing is shifted for direct driving.

8. In a motor vehicle having an engine and traction wheels, driving connections from said engine to said wheels, comprising, a shiftable clutch leading from said engine, differential gearing leading to said wheels, transmission gearing shiftable for forward direct and indirect driving and for reverse driving and arranged intermediate said clutch and said differential gearing, and a clutch device between said clutch and said transmission gearing adapted to effect driving of said wheels by said engine but preclude driving of said engine by said wheels when said transmission gearing is shifted for direct driving.

Signed at St. Louis, Missouri, this 2nd day of July, 1920.

CHARLES F. FELTZ.